United States Patent
Atwater et al.

(10) Patent No.: US 9,979,011 B2
(45) Date of Patent: May 22, 2018

(54) LIXMN2O4-Y(C1Z) SPINAL CATHODE MATERIAL, METHOD OF PREPARING THE SAME, AND RECHARGEABLE LITHIUM AND LI-ION ELECTROCHEMICAL SYSTEMS CONTAINING THE SAME

(71) Applicant: The United States of America, as represented by the Secretary of the Army, Washington, DC (US)

(72) Inventors: Terrill B. Atwater, Bel Air, MD (US); Paula C. Latorre, Bel Air, MD (US); Ashley L. Ruth, Bel Air, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 95 days.

(21) Appl. No.: 14/497,620

(22) Filed: Sep. 26, 2014

(65) Prior Publication Data

US 2016/0093876 A1    Mar. 31, 2016

(51) Int. Cl.
| | |
|---|---|
| H01M 4/1315 | (2010.01) |
| H01M 4/505 | (2010.01) |
| C01G 45/12 | (2006.01) |
| H01M 4/62 | (2006.01) |
| H01M 4/131 | (2010.01) |
| H01M 10/0525 | (2010.01) |
| C01G 53/00 | (2006.01) |

(52) U.S. Cl.
CPC ...... *H01M 4/1315* (2013.01); *C01G 45/1242* (2013.01); *H01M 4/505* (2013.01); *C01G 53/54* (2013.01); *C01P 2002/32* (2013.01); *C01P 2002/72* (2013.01); *C01P 2002/88* (2013.01); *C01P 2004/61* (2013.01); *C01P 2006/40* (2013.01); *H01M 4/131* (2013.01); *H01M 4/623* (2013.01); *H01M 4/625* (2013.01); *H01M 10/0525* (2013.01)

(58) Field of Classification Search
CPC ........................... C01G 45/1242; C01G 53/54
See application file for complete search history.

(56) References Cited

U.S. PATENT DOCUMENTS

| | | | |
|---|---|---|---|
| 5,135,732 A | 8/1992 | Barboux et al. | |
| 5,753,202 A | 5/1998 | Wang et al. | |
| 5,976,489 A * | 11/1999 | Saidi | C01G 45/1221 423/599 |
| 6,274,273 B1 * | 8/2001 | Cho | C01G 45/1242 252/182.1 |
| 6,752,979 B1 * | 6/2004 | Talbot | B82Y 30/00 423/263 |
| 2003/0235758 A1 * | 12/2003 | Wu | C01G 45/1242 429/224 |

(Continued)

*Primary Examiner* — Jeremiah R Smith
(74) *Attorney, Agent, or Firm* — Azza Jayaprakash

(57) ABSTRACT

A method of preparing a homogeneously dispersed chlorine-modified lithium manganese-based $AB_2O_4$ spinel cathode material is provided. Furthermore, a homogeneously dispersed chlorine-modified lithium manganese-based $AB_2O_4$ spinel cathode material is provided. In addition, a lithium or lithium ion rechargeable electrochemical cell is provided incorporating a homogeneously dispersed chlorine-modified lithium manganese-based $AB_2O_4$ spinel cathode material in a positive electrode.

5 Claims, 17 Drawing Sheets

(56) References Cited

U.S. PATENT DOCUMENTS

2007/0003834 A1* 1/2007 Gao .................. C01G 45/1228
429/224
2015/0197872 A1* 7/2015 Ozoemena ............ C01G 53/54
117/7

* cited by examiner

# LIXMN2O4-Y(C1Z) SPINAL CATHODE MATERIAL, METHOD OF PREPARING THE SAME, AND RECHARGEABLE LITHIUM AND LI-ION ELECTROCHEMICAL SYSTEMS CONTAINING THE SAME

GOVERNMENT INTEREST

The invention described herein may be manufactured, used, imported, sold, and licensed by or for the Government of the United States of America without the payment of any royalty thereon or therefor.

FIELD OF THE INVENTION

The present disclosure relates generally to the field of electrochemical power sources and, more particularly, to rechargeable lithium and lithium-ion batteries using manganese-based materials as a positive electrode.

BACKGROUND OF THE INVENTION

Perhaps the most popular battery chemistries that have hit the consumer market recently are lithium-based systems. Lithium batteries use high valence metal oxide materials, which are reduced during the electrochemical reaction. This reaction in rechargeable lithium and rechargeable lithium ion batteries must be fully reversible in order to have a commercially viable cell. These electrochemical systems include manganese-based lithium metal oxides configured in lithium, lithium ion, and lithium polymer electrochemical cells. Common reversible metal oxide materials used in lithium batteries include $Li_xMn_2O_4$, $Li_xMnO_2$, $Li_xCoO_2$, $Li_xNiO_2$, and $Li_xNi_yCoO_2$.

Today, rechargeable lithium batteries are used in portable electronic devices including cellular phones and laptop computers. Future use of rechargeable lithium battery systems is targeted at applications related to electronic vehicles and pairing with fuel cells to produce high-energy systems with excellent pulse capabilities. Lithium batteries have the flexibility of being packaged into either cylindrical or prismatic cell designs; this feature makes them applicable to almost any portable electronic system where battery volume is a concern.

The benefits of lithium battery systems include high specific energy (Wh/kg) and high energy density (Wh/l). Lithium electrochemical systems produce a relatively high nominal voltage between 3.0 and 4.75 volts. Lithium electrochemical systems can operate between 3.0 and 4.35 volts or between 2.0 and 3.5 volts. Additionally, lithium electrochemical systems have excellent charge retention due to a low self-discharge rate.

Manganese dioxide ($MnO_2$) based materials are attractive for use as a cathode material in lithium electrochemical systems. $MnO_2$ is attractive because of its high energy density and low material cost. $MnO_2$ is an active material which creates a skeletal structure that allows lithium cations to fill vacancies and voids within the structure. Ideally, this structure does not change with cycling; altering of this crystal structure may cause capacity fading. Additionally, the $MnO_2$ active material exists in different forms. These forms include a lithiated spinel ($Li_xMn_2O_4$) and its different structures denoted by $\alpha$, $\beta$, $\gamma$, and $\lambda$. In lithium electrochemical cells, the active material is bound to an aluminum current collector with either Teflon or pVdF mixed with conductive carbon. The conductive carbon serves as an aid for electron transfer.

Capacity fading is a major problem for rechargeable lithium cells. Capacity fading is the loss of cycle capacity in a cell over the life of an electrochemical system, limiting the practical number of cycles that may be used. In lithium battery systems, capacity fading is often attributed to the degradation of the active cathode material. This cyclic capacity loss is a result of both changes in composition and crystal structure of the active cathode material. Additionally, throughout the life of a cell, parasitic side reactions occur between chemical species of all cell components. Methods of reducing this effect include modifying the crystal structure and/or composition of the active material.

Capacity fading associated with the cathode material has also been linked to the fracture of active material and the dissociation or disconnection of the fractured active material from the electrode. Fractures are caused by mechanical stress-strain of $MnO_2$ crystal structures during cycling of the cell. Stress-strain forces act on the crystal structures as a result of repeated phase transitions. These stress-strain forces are due to the insertion and extraction of lithium in the cathode lattice. This frequent conversion in geometry and dimension of the crystal lattice creates a significant mechanical strain on the cathode. This mechanical strain is believed to electrically disconnect active material from the electrode through fracture. Additionally an external influence, such as elevated temperature, can also promote cathode fracture. In this case structural vibrations increase with temperature, resulting in the disconnection of the fractured active material from the electrode.

Another major cause of capacity fading in manganese-based cathodes is the dissolution of manganese into the electrolyte. Through a series of chemical reactions, manganese ($Mn^{2+}$) is removed from the cathode and dissolved into the electrolyte, resulting in a decrease of active material in the cathode. Manganese dissolution is linked to reactions with the electrolyte and, more importantly, the impurities dissolved within the electrolyte. Many of these reactions are linked to the water content of the electrolyte and the presence of hydrofluoric acid (HF). The products of parasitic reactions are phase transitions of the $MnO_2$ structure, which results in the formation of $Mn_2O_3$ and $Mn_3O_4$.

Manganese dioxide ($MnO_2$) provides a skeletal background for lithium intercalation during cycling of a lithium electrochemical cell. When fully charged, manganese particles have a meta-stable 4+ valence state. This meta-stable 4+ valence state allows for the attraction and intercalation of lithium cations into the lattice structure. As lithium cations fill the skeleton crystal structure during discharge, the crystal structure of the active material changes. Charging of the cell removes these lithium cations from the cathode, again altering the crystal structure. Ideally, this is a completely efficient and reversible process, but realistically, continuous crystal structure changes lead to phase transitions that can impede lithium mobility. As a result of these phase changes, unwanted crystal structures develop that are either too stable for electrochemical reactions or block the insertion/extraction paths of lithium cations into the cathode material. This general phenomenon is regarded as the major contributor to capacity fading.

$MnO_2$ exists in several phases or crystal structures and are referred to by the following prefixes: $\alpha$, $\beta$, $\gamma$, and $\lambda$. $\alpha$-$MnO_2$ is the most stable $MnO_2$ structure. $\alpha$-$MnO_2$ is one-dimensional and the lattice contains both one by one and two by two channels for lithium insertion/extraction. $\beta$-$MnO_2$ is a tetragonal structure with the lattice containing one by one channels for lithium insertion/extraction. $\gamma$-$MnO_2$ is also one-dimensional, existing in both hexagonal or orthorhombic crystal structures with a lattice that contains one by two channels for lithium insertion/extraction. Because of their stability α-$MnO_2$, β-$MnO_2$, and γ-$MnO_2$ are not considered rechargeable. However, cycling of lithium into the α-$MnO_2$, β-$MnO_2$, and γ-$MnO_2$ lattice can be achieved with rigid stoichiometric control.

λ-$MnO_2$ is considered the preferred $MnO_2$ based cathode material for rechargeable lithium electrochemical systems. λ-$MnO_2$ is created through the delithiation of $Li_xMn_2O_4$ $AB_2O_4$ spinel. The λ-$MnO_2$ crystal structure is maintained through both charge and discharge of the $LiMn_2O_4$ spinel. The maintenance of the λ-$MnO_2$ structure during insertion and extraction of lithium in the $Li_xMn_2O_4$ spinel makes it an attractive couple with lithium for rechargeable electrochemical systems. The λ-$MnO_2$ crystal structure is a three dimensional cubic array. This crystal structure promotes mechanical stability and adequate pathways for lithium insertion/extraction. Degradation of the λ-$MnO_2$ crystal structure forming α, β, or γ-$MnO_2$ crystals and other $Mn_xO_y$ phases reduces the capacity of the cathode material.

As lithium intercalates, the size and orientation of the crystal structures change. In $Li_xMn_2O_4$ spinel materials, when $0.05<x<1$, the crystal structure is cubic (λ-MnO2). When $1<x<1.8$, the structure of $Li_xMn_2O_4$ (no longer a $AB_2O_4$ spinel) is tetragonal. Additionally, when $x<0.05$, a phase transition to the more stable α, β, and γ $MnO_2$ can occur. Continued charge and discharge promotes the transformation of the cubic crystal structure to other cubic, tetragonal, and monoclinic phases. Tetragonal and monoclinic crystal structures may become inactive leading to the loss of active cathode material.

Voltage control, maintaining $0.05<x<1$, allows for the mitigation of the formation of unwanted crystal structures. When the potential of the lithium/$Li_xMn_2O_4$ electrochemical system is maintained between 3.0 and 4.25 volts, the cubic phase is maintained. Once the potential of the system drops below 3.0 volts the $Li_xMn_2O_4$ cathode material undergoes a phase change from cubic to tetragonal. When the potential of the system increases above 4.25 volts, the $Li_xMn_2O_4$ cathode material becomes stripped of the lithium component and undergoes a phase change from cubic (λ-$MnO_2$) to the more stable α, β and/or γ $MnO_2$.

Other phase transitions that lead to capacity fading include the formation of $Mn_2O_3$ and $Mn_3O_4$. The $Mn_2O_3$ and $Mn_3O_4$ formations result from the liberation of oxygen in the $MnO_2$ and $Mn_2O_4$ structures. The valence state of manganese in these structures is 3+ or less. This lower valence state creates a stable crystal structure that is not conducive to lithium intercalation and, therefore, not rechargeable. As more $Mn_2O_3$ and $Mn_3O_4$ are formed, less $MnO_2$ and $Mn_2O_4$ remain and the usefulness of the cathode decreases.

Thus, one of the disadvantages of conventional lithium manganese-based $AB_2O_4$ spinel materials is the limited cycle life and limited rate capability for lithium electrochemical systems. Furthermore, this problem is a major obstacle for rechargeable lithium battery technology. An additional limiting factor for lithium manganese-based $AB_2O_4$ spinel materials is the time required to process the raw materials and synthesize the desired product; conventional methods require multiple mixing, grinding and calcining steps, which takes days to complete.

SUMMARY OF THE INVENTION

The present disclosure resolves the aforementioned problems associated with conventional lithium manganese-based $AB_2O_4$ spinel cathode materials in lithium electrochemical systems and rechargeable lithium electrochemical systems. The present disclosure provides a chlorine-modified lithium manganese-based $AB_2O_4$ spinel cathode material with improved performance over conventional $LiMn_2O_4$ lithium battery cathode material. The present chlorine-modified lithium manganese-based $AB_2O_4$ spinel cathode material exhibits overvoltage and under-voltage tolerance and avoids problems associated with loss of reversibility in lithium batteries without suffering from the disadvantages, limitations, and shortcomings associated with rigid stoichiometry electronic control.

More specifically, the present $Li/Li_xMn_2O_{4-y}Cl_z$ electrochemical cells exhibit increased discharge potential and enhanced over-charge potential behavior that allows the cathode to be fully reversible at elevated charge potentials and decreased discharge potentials. The present electrochemical cell system maintains its recyclability after charge potentials greater than 5.0 volts and discharge potentials less than 2.0 volts. Thus, the present $Li/Li_xMn_2O_{4-y}Cl_z$ electrochemical cells produce the required reversibility and meet other significant lithium battery operational objectives (e.g., low impedance and thermal stability). In addition, the cycle life of the lithium cells fabricated using the present spinel material is significantly longer than cells fabricated using conventional lithium manganese-based $AB_2O_4$ spinel materials.

In contrast to conventional preparation methods, the addition of chlorine in the formulation and fabrication process is evenly distributed throughout the bulk of the material. While conventional preparation methods tend to produce materials with concentration gradients radiating from the particle edge to the particle core, the preparation method according to the present disclosure provides for an even distribution within the body of the particle. In the glycine nitrate combustion method of present disclosure, the chlorine and metal ions, along with nitrates and glycine, are dissolved in solution and are able to interact on a molecular level. As a result of this molecular level interaction, the formation of the ash during combustion yields a homogenous mixture of components formed in situ. When chlorine is added using conventional preparation methods, an additional step is required where chlorine must penetrate into the material from the surface, leading to a concentration gradient within each particle with chlorine concentration being the highest at the surface.

In addition, the preparation method according to the present disclosure provides for a reduced particle size of uniform size. Optical microscopy using a metallograph was used to examine the $Li_xMn_2O_{4-y}Cl_z$ material of the present disclosure, as well as $Li_xMn_2O$ spinel cathode material made using conventional processing methods. It was found that the $Li_xMn_2O_{4-y}Cl_z$ material made using the glycine nitrate combustion method of the present disclosure had a typical particle size of about 2.5 µm with a maximum particle size of less than 10 µm. It was found that $Li_xMn_2O$ spinel cathode material made using conventional processing methods yielded particle sizes of 100 µm to 500 µm. Further evaluation of the material found that the crystallites within the $Li_xMn_2O_{4-y}Cl_z$ material of the present preparation method are in the order of 32 nm, and the crystallites within the $Li_xMn_2O$ spinel cathode material made using conventional preparation methods was 56.8 nm. The crystallites sizes were determined using the Scherrer equation, which is a formula that relates the size of sub-micrometer crystallites in a solid to the broadening of a peak in a diffraction pattern. Furthermore, the cycle life of the lithium cells fabricated using the present $Li_xMn_2O_{4-y}Cl_z$ spinel cathode material is significantly longer than cells fabricated using conventional lithium manganese-based $AB_2O_4$ spinel materials.

According to an exemplary embodiment of the present disclosure, a method of preparing a homogeneously dispersed chlorine-modified lithium manganese-based $AB_2O_4$ spinel cathode material includes dissolving a chlorine-containing salt, manganese nitrate, and lithium nitrate in distilled or deionized water to produce an aqueous solution; mixing the aqueous solution with a chelating agent to produce a mixture; heating the mixture to produce an ash; grinding the ash; and calcining the ground ash for a time period no greater than 5 hours at a temperature of at least 350° C. to produce the homogeneously dispersed chlorine-modified lithium manganese-based $AB_2O_4$ spinel cathode material.

Another exemplary embodiment of the present disclosure is the aforementioned homogeneously dispersed chlorine-modified lithium manganese-based $AB_2O_4$ spinel cathode material. In yet another embodiment of the present disclosure, a lithium electrochemical cell includes a lithium metal or lithium ion anode and a cathode containing the present homogeneously dispersed chlorine-modified lithium manganese-based $AB_2O_4$ spinel cathode material.

BRIEF DESCRIPTION OF THE DRAWINGS

The accompanying drawings, which are included to provide further understanding of the present disclosure, and are incorporated in and constitute a part of the specification, illustrate preferred embodiments of the present disclosure, and together with the description serve to explain the principles of the present disclosure. The present disclosure will now be described further with reference to the accompanying drawings as follows.

DETAILED DESCRIPTION

Figure 1:
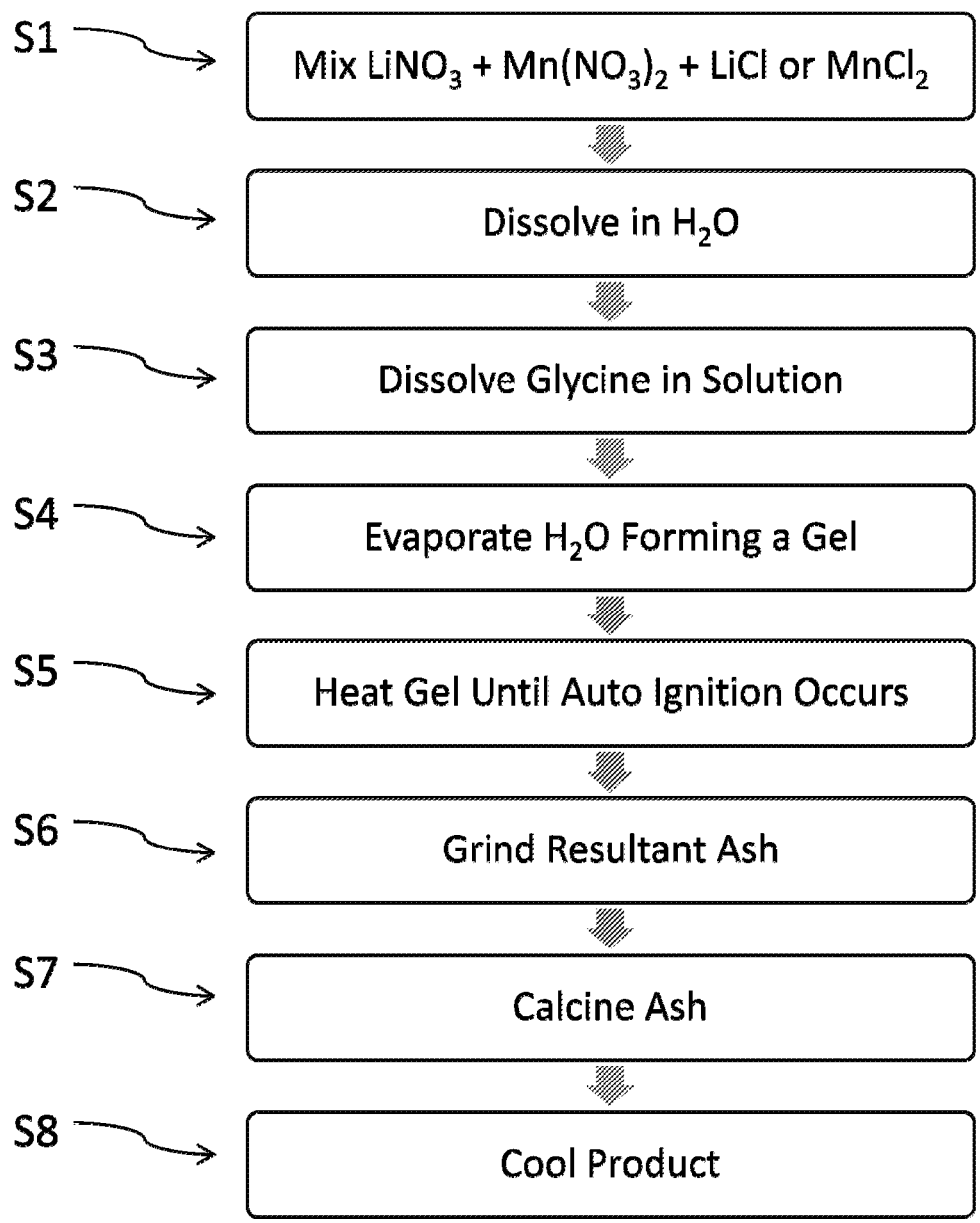
FIG. 1 is a flowchart illustrating process steps for preparing a stable lithium manganese-based $AB_2O_4$ spinel material, according to an exemplary embodiment of the present disclosure.

FIG. 1 is a flowchart illustrating process steps in an exemplary embodiment of the present disclosure. More specifically, FIG. 1 shows exemplary steps according to the present disclosure for the preparation of $Li_xMn_2O_{4-y}(Cl_z)$ spinel material via a method comprising an initial nitrate glycine flame process followed by a calcining reaction. In step S1, a chlorine-containing salt in a solid state is added to manganese nitrate in a solid state and lithium nitrate in a solid state. The stoichiometric ratio of lithium to manganese to chlorine (Li:Mn:Cl) in the mixture of starting materials ranges from 0.45 to 0.6:1.0:0.005 to 0.35, from 0.45 to 0.6:1.0:0.015 to 0.2, or 0.45 to 0.6:1.0:0.03. to 0.15. Suitable chlorine-containing salts include, but are not limited to, lithium chloride and manganese chloride.

In Step S2, the mixture is then dissolved in distilled or deionized water. Alternatively, the chlorine-containing salt, manganese nitrate, and lithium nitrate may be each dissolved individually in distilled or deionized water, and the aqueous solutions may be then combined. In Step S3, a chelating agent is then dissolved into the aqueous solution. Suitable chelating agents include, but are not limited to, glycine. In Step S4, the solution is heated to a temperature ranging from 75° C. to 120° C. until the water fully evaporates and a gel is formed. In Step S5, the gel is heated further to a temperature ranging from 200° C. to 300° C. until auto ignition occurs and forms an ash. The ash is collected and ground in Step S6. Suitable grinding methods include, but are not limited to, ball milling, high amplitude vibration milling, and mortar and pestle mixing.

In Step S7, the ash is calcined in a furnace at 600° C. for 2 hours. Alternatively, suitable calcination temperatures and times range from 350° C. to 800° C. (for 1 to 4 hours), from 400° C. to 600° C. (for 1.5 to 3 hours), or from 500° C. to 600° C. (for 2 to 2.5 hours). In Step S8, the mixture is cooled at a temperature ranging from 20° C. to 300° C. (for 1 to 24 hours), from 20° C. to 150° C. (for 1 to 4 hours), or from 20° C. to 50° C. (for 1 to 2.5 hours).

The exemplary process described above results in the formulation of a family of chlorine-modified $Li_xMn_2O_4$ $AB_2O_4$ spinel materials. The general formula for the lithium electrochemical cell cathode prepared is $Li_xMn_2O_{4-y}(Cl_z)$, where x≈1 and proves to be reversible between 5.2 and 2.0 volts. This reversible region for x in a lithium electrochemical cell comprised of the present disclosure ranges from 0.05 to 1.9 and z ranges from 0.005 to 0.70, from 0.015 to 0.4, or from 0.03 to 0.3.

The addition of chlorine in the formulation and fabrication process is evenly distributed throughout the bulk of the chlorine-modified $Li_xMn_2O_4$ $AB_2O_4$ spinel material. In the exemplary process described above, the chlorine and metal ions, along with nitrates and glycine, are dissolved in solution and able to interact on a molecular level. As a result of this molecular level interaction the formation of the ash during combustion yields a homogenous mixture of components formed in situ. When chlorine is added using conventional preparation methods, an additional step is required where chlorine must penetrate into the material from the surface, leading to a concentration gradient within each particle with chlorine concentration being the highest at the surface.

Figure 2:
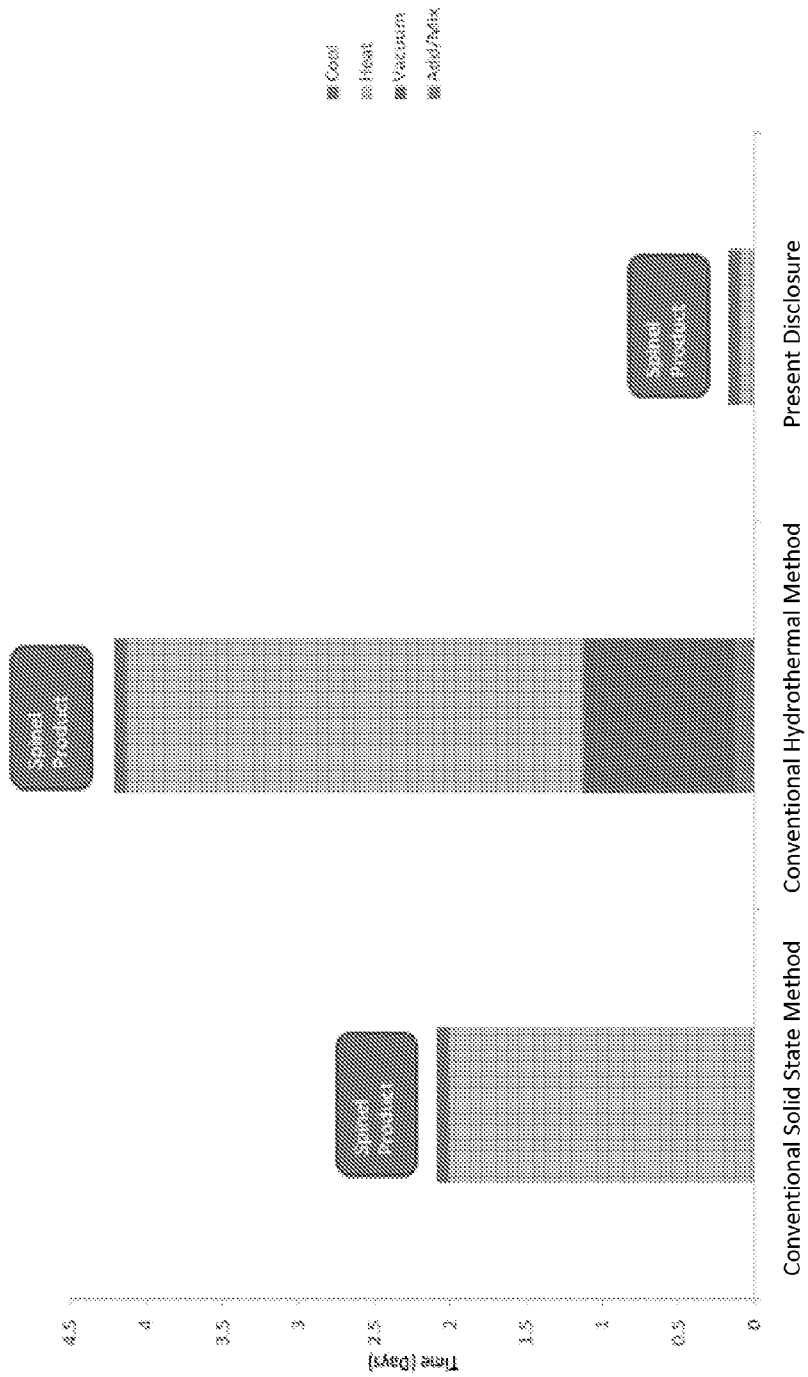
FIG. 2 is a timeline chart contrasting the required fabrication times for preparing a stable lithium manganese-based $AB_2O_4$ spinel material, according to the present disclosure, versus required fabrication times for conventional preparation methods.
Figure 3:
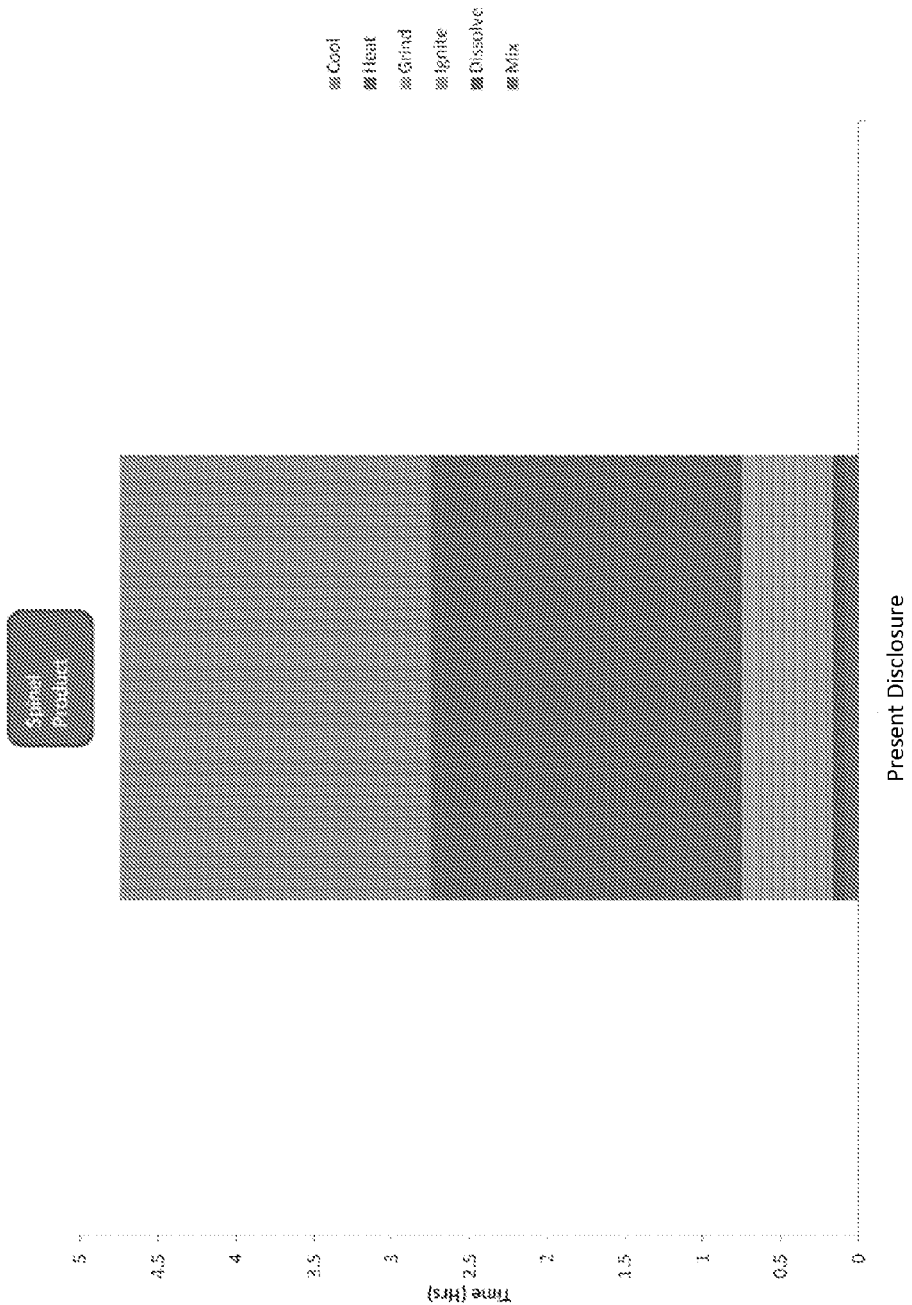
FIG. 3 is an expanded spinel formation timeline chart showing an exemplary embodiment according to the present disclosure.

FIGS. 2 and 3 illustrate steps and timelines for conventional fabrication methods versus the preparation methods provided in the present disclosure. These conventional solid state and hydrothermal fabrication methods are described in U.S. Pat. No. 5,753,202 and U.S. Pat. No. 5,135,732, respectively (which are incorporated by reference in their entirety). FIG. 3 shows an expanded view of the steps of an exemplary method according to the present disclosure. As shown in FIGS. 2 and 3, the entire fabrication process (including cooling time) takes over 2 or 4 days using conventional solid state and hydrothermal methods, respectively. In contrast, the entire fabrication process (including cooling time) takes approximately 4.5 hours using the present fabrication method.

Figure 4:
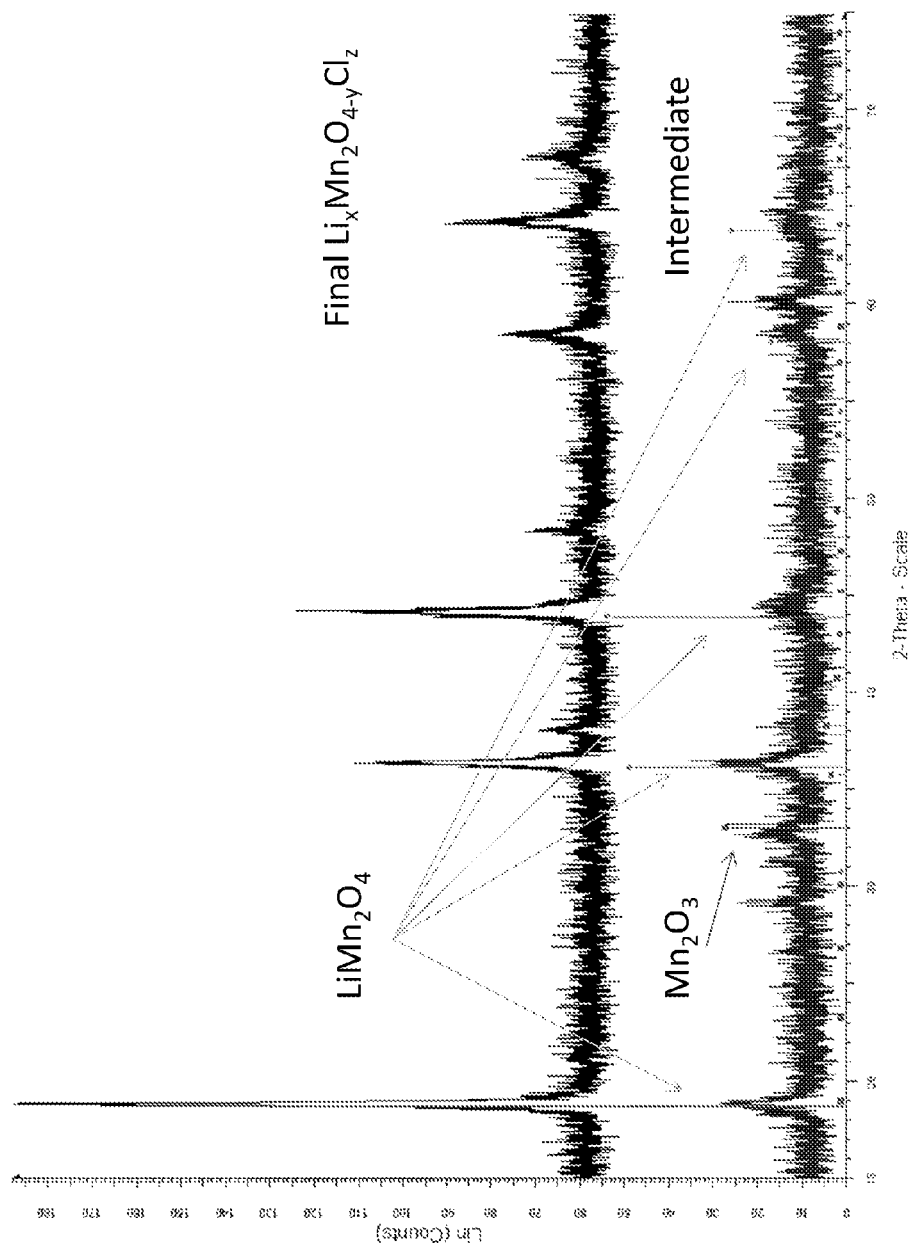
FIG. 4 is a graph showing x-ray diffraction data for an exemplary formulation mixture according to the present disclosure.
Figure 5:
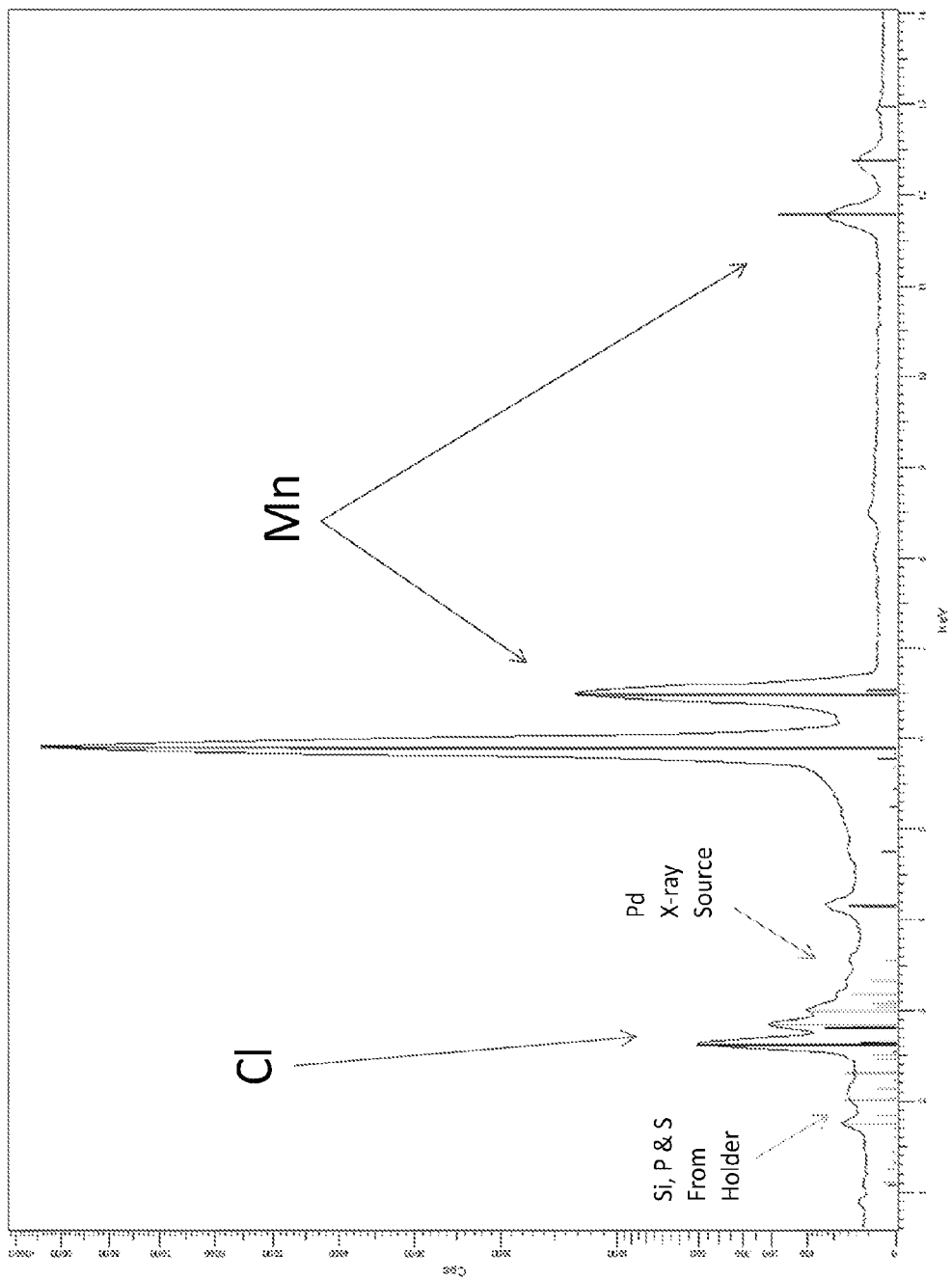
FIG. 5 is a graph showing x-ray fluorescence data for an exemplary formulation mixture according to the present disclosure.

FIG. 4 shows the X-ray diffraction pattern for the intermediate (pre-calcining) and final $Li_xMn_2O_{4-y}Cl_z$ material according to the present disclosure. FIG. 4 includes standard data for intensity and location from the International Center for Diffraction Data for $Mn_2O_3$, card file number 24-508 and $LiMn_2O_4$ spinel, card file number 18-736. FIG. 5 shows the X-ray Fluorescence Pattern for an exemplary formulation mixture of the present disclosure. The data in FIG. 5 shows the X-ray Fluorescence Pattern data of the final $Li_xMn_2O_{4-y}Cl_z$ material as well as intensity and energy level for the system components. These components include the palladium X-ray source and silicon, phosphorus and sulfur from the sample holder.

Optical microscopy using an Olympus metallograph was used to examine the $Li_xMn_2O_{4-y}Cl_z$ material of the present disclosure as well as $Li_xMn_2O$ spinel cathode material made using conventional processing methods. It was found that the $Li_xMn_2O_{4-y}Cl_z$ material of the present disclosure had a typical particle size of about 2.5 µm with a maximum particle size of less than 10 µm. It was found that $Li_xMn_2O$ spinel cathode material made using conventional processing methods yielded particle sizes of 100 µm to 500 µm. Further evaluation of the material found that the crystallites within the $Li_xMn_2O_{4-y}Cl_z$ material made using the present preparation method are in the order of 32 nm, and the crystallites within the $Li_xMn_2O$ spinel cathode material made using conventional processing 56.8 nm. The crystallites sizes were determined using the Scherrer equation, a formula that relates the size of sub-micrometer crystallites in a solid to the broadening of a peak in a diffraction pattern.

Figure 6:
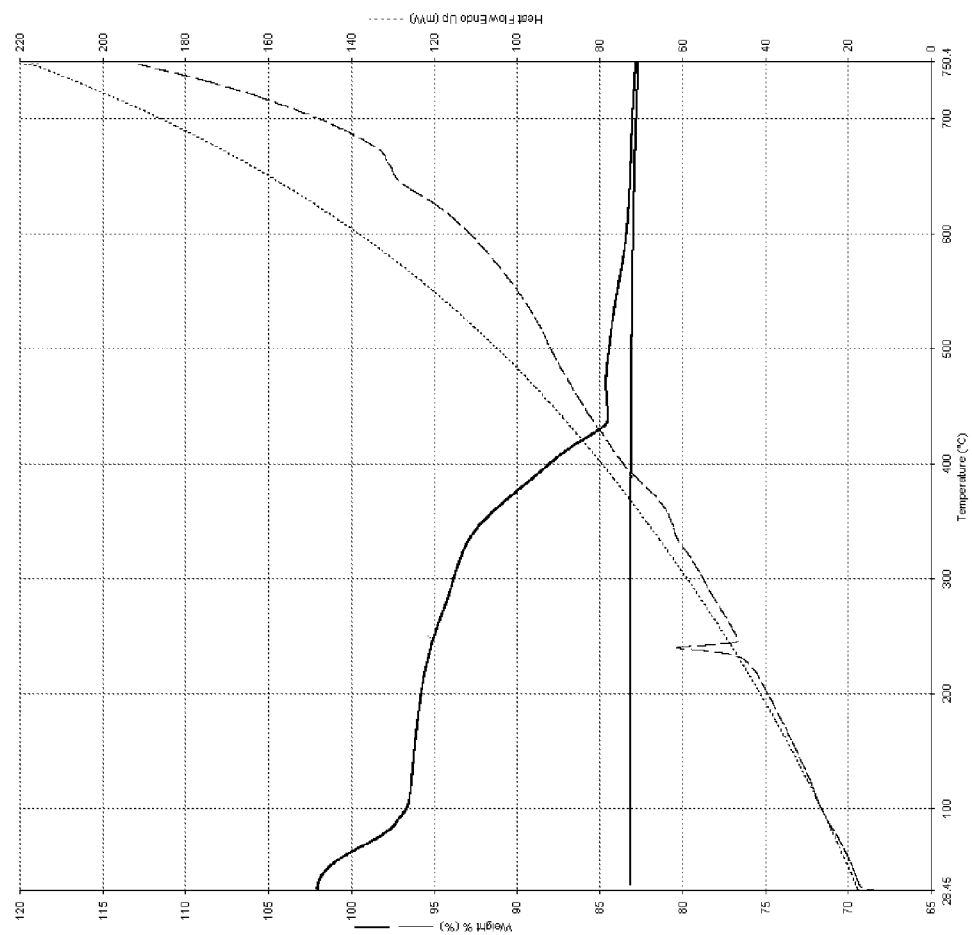
FIG. 6 is a graph showing thermal analysis data for an exemplary intermediate (pre-calcining) material according to the present disclosure.
Figure 7:
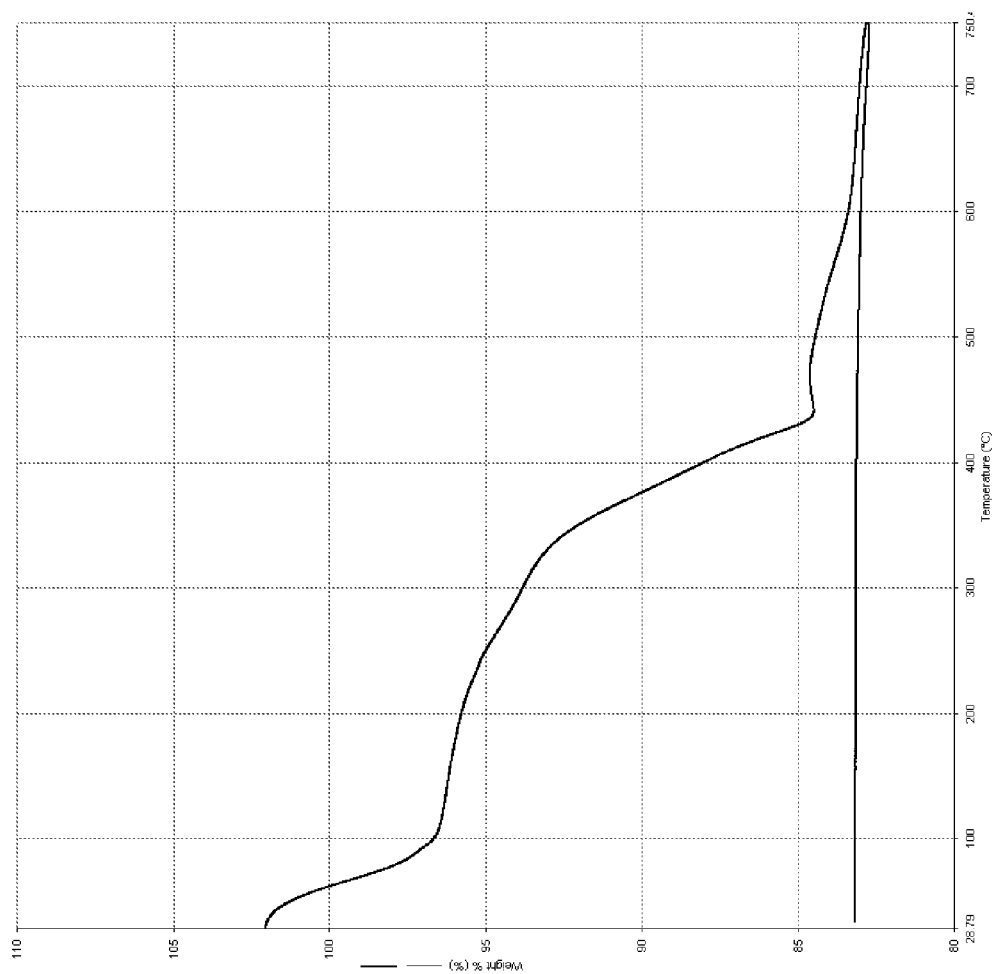
FIG. 7 is a graph showing thermal gravimetric data for an exemplary intermediate (pre-calcining) material according to the present disclosure.
Figure 8:
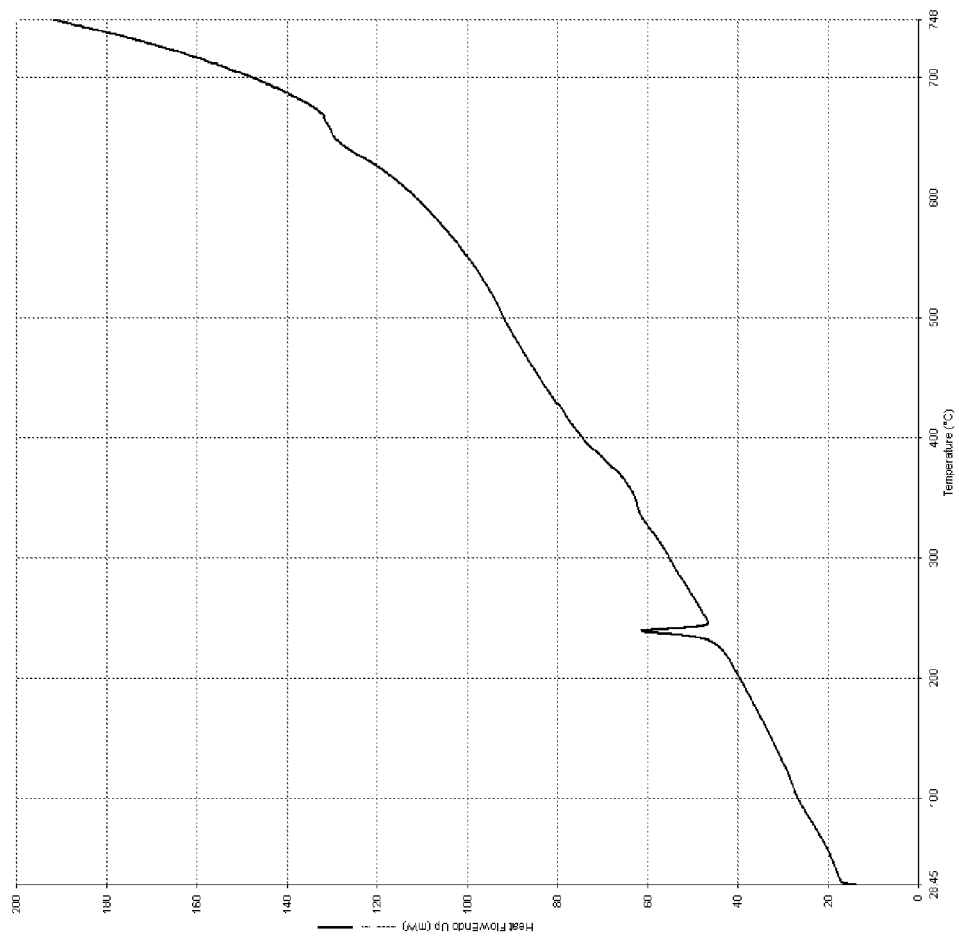
FIG. 8 is a graph showing differential scanning calorimetric heating cycle data for an exemplary intermediate (pre-calcining) material according to the present disclosure.
Figure 9:
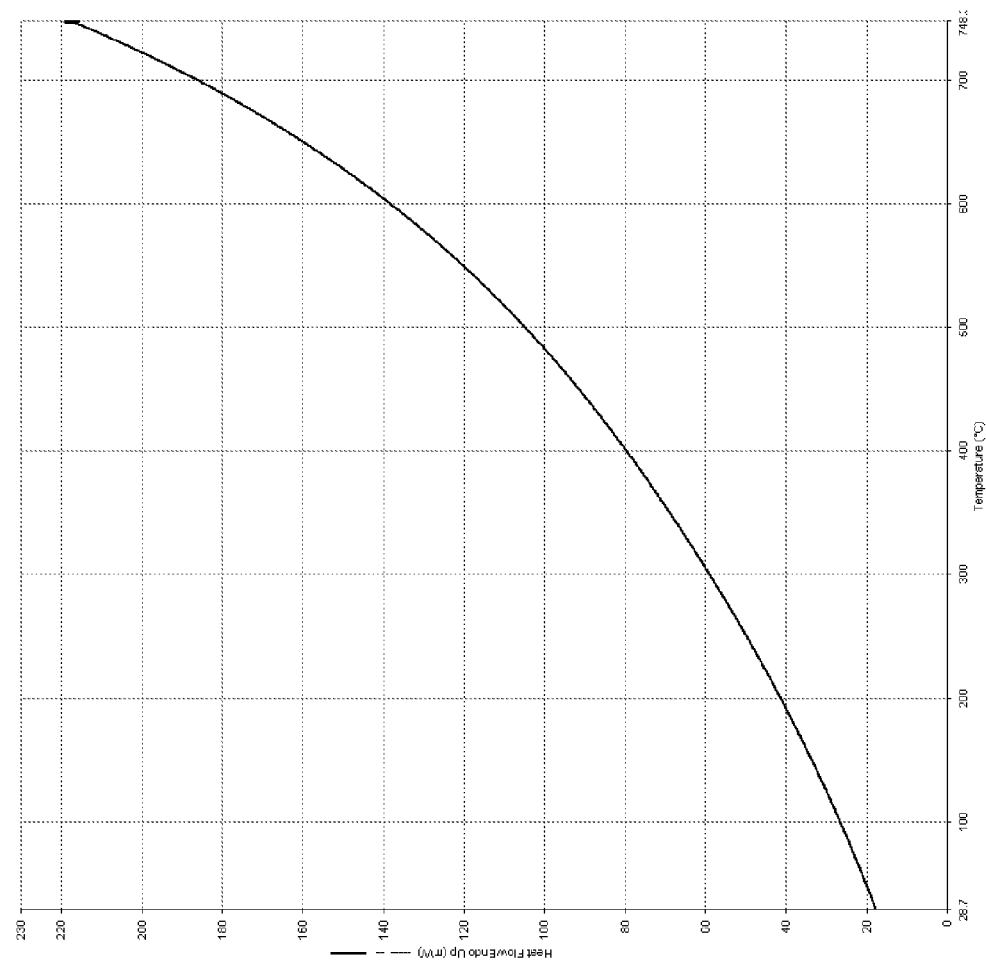
FIG. 9 is a graph showing differential scanning calorimetric cooling cycle data for an exemplary intermediate (pre-calcining) material according to the present disclosure.

FIGS. 6-9 show thermal analysis data for the intermediate (pre-calcining) material according to the present disclosure. FIG. 6 shows both the thermal gravimetric data and the differential scanning calorimeter data. In particular, the thermal gravimetric data is displayed in FIG. 7 and the differential scanning calorimeter data, heating trace and cooling trace is displayed in FIGS. 8 and 9 respectively. The data presented in FIG. 7 show the reaction is driven to completion by 600° C. where the weight of the residual material becomes stable. The differential scanning calorimeter data depicted in FIG. 8 shows the phase refinement of the material at 235° C. The featureless differential scanning calorimeter cool down data shown in FIG. 9 shows that the final $Li_xMn_2O_{4-y}Cl_z$ material is stable with no additional phase changes after calcining.

In order to evaluate the electrochemical properties of the present chlorine-modified lithium manganese-based $AB_2O_4$ spinel electrochemical system, laboratory coin cells were fabricated using conventional methods described in detail below. Experimental cells may also be fabricated using other methods known in the art, incorporating the chlorine-modified lithium manganese-based $AB_2O_4$ spinel material described in the present disclosure. The experimental cells were composed of a lithium anode separated from a Teflon bonded cathode with a nonwoven glass separator. Other suitable anode materials include, but are not limited to, lithium metal, lithium aluminum alloy, lithium silicon alloy, graphite and graphite derivatives, tin oxide, and lithium phosphate. The cathode was fabricated by combining $Li_xMn_2O_{4-y}Cl_z$, carbon, and Teflon in a 75:15:10 weight percent basis, respectively. Suitable conductive carbon materials include, but are not limited to, conductive carbon black (commercially available from various sources, including Cabot Corporation, under the tradename VULCAN XC72 or VULCAN XC72R), graphite, carbon nanofibers, and carbon nanoparticles (commercially available under the tradename PURE BLACK, manufactured by Superior Graphite Co.). Suitable binders include, but are not limited to, polytetrafluoroethylene (commercially available under the trade name TEFLON, manufactured by DuPont), polyvinylidene fluoride (PVDF), and latex. The cathode may contain by weight 40%-95% of $Li_xMn_2O_{4-y}F_y$, 1%-40% of conductive carbon, and 1%-20% binder.

The cathode mix was rolled to 0.06 cm and dried in a vacuum oven. The cathode mass was approximately 0.1 g. The cathode and 0.075 cm thick lithium foil was cut using a 1.58 cm diameter (1.96 cm2) hole punch. A 0.01 cm nonwoven glass separator was used for the separator and as a wick. The electrolyte used was 1 M LiPF6 in proportional mixtures of dimethyl carbonate and ethylene carbonate. Other suitable electrolytes include, but are not limited to, lithium hexafluoroarsenate monohydrate ($LiAsF_6$), lithium perchlorate ($LiClO_4$), lithium tetrafluoroborate ($LiBF_4$), and lithium triflate ($LiCF_3SO_3$).

The cells were cycled with an ARBIN Model MSTAT4 Battery Test System. The charge profile consisted of a constant current charged at 1.0 mA to 4.75 volts. The cells were discharged at 1.0 mA to 3.5 volts. A rest period of 15 minutes between cycles allowed for the cells to equilibrate. Prior to cycling, cell impedance was recorded with a Solartron, SI1260 Frequency Response Analyzer with a Solartron, SI1287 Electrochemical Interface using Scribner Associates, Inc., ZPlot and ZView software. The data is used as a quality control tool and for comparative use between variant chemistries.

In FIGS. 10-17, the data shows stable chlorine-modified lithium manganese-based $AB_2O_4$ spinel material was formulated, fabricated, and characterized as a positive electrode suitable for lithium and lithium ion rechargeable electrochemical cells and batteries. The general formula for the present spinel material is $Li_xMn_2O_{4-y}(Cl_z)$, where x ranges from 0.05 to 1.9 and y≈z ranges from 0.005 to 0.7, from 0.015 to 0.4, or from 0.03 to 0.3. The specific capacity for the chlorine-modified lithium manganese-based $AB_2O_4$ spinel cathode material was 87 mAh/g when coupled with lithium and cycled between 3.5 and 4.75 volts. This is comparable to conventional lithium manganese-based $AB_2O_4$ spinel materials fabricated over a 48 to 72-hour time span. Processing time according to the present disclosure has been dramatically reduced to less than 8 hours.

Figure 10:
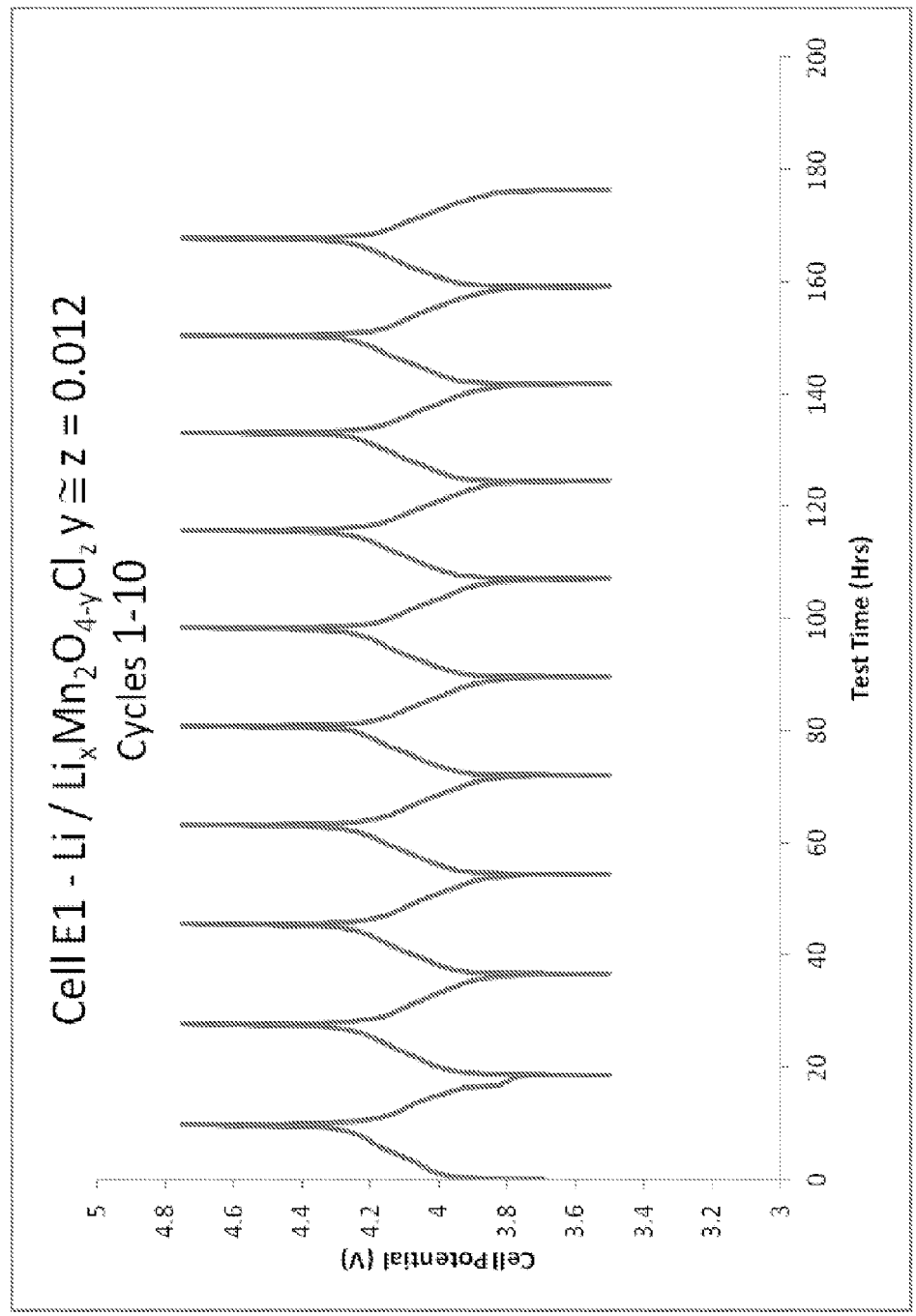
FIG. 10 is a graph illustrating representative cycling (charge/discharge) curves for an exemplary chlorine-modified lithium manganese-based $AB_2O_4$ spinel material according to the present disclosure.
Figure 11:
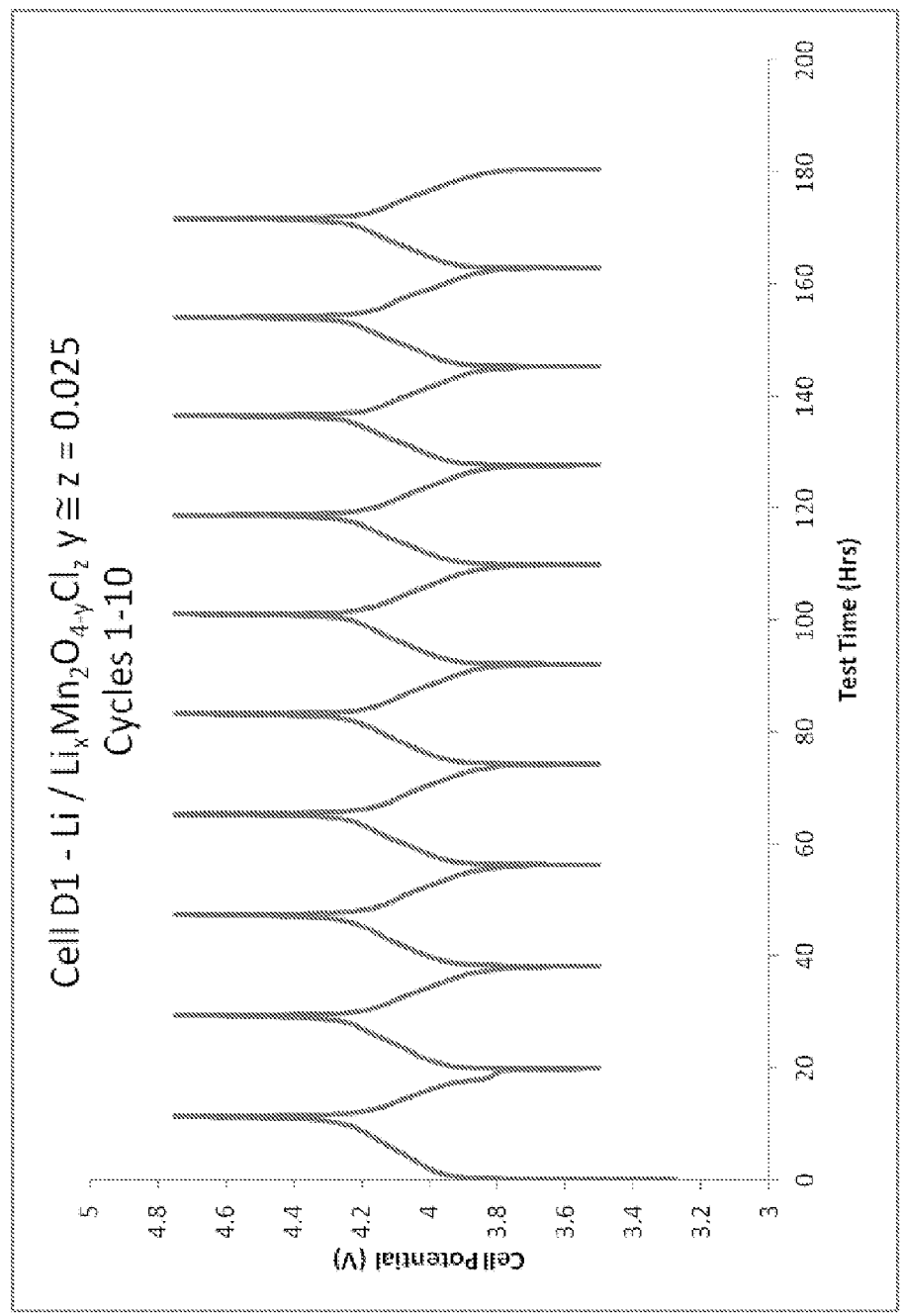
FIG. 11 is a graph illustrating representative cycling (charge/discharge) curves for an exemplary chlorine-modified lithium manganese-based $AB_2O_4$ spinel material according to the present disclosure.

FIGS. 10 and 11 show galvanostatic (charge/discharge) plots for lithium electrochemical cells fabricated with chlorine-modified lithium manganese-based $AB_2O_4$ spinel cathode material, synthesized using the method described in the present disclosure with varying chlorine ratios in the starting material. In FIG. 10, the stoichiometric ratio of chlorine to manganese is 0.012:2.0. In FIG. 11, the stoichiometric ratio of chlorine to manganese is 0.025:2.0.

FIGS. 12 through 15 show the differential capacity data and provides information regarding the underlying thermodynamics and kinetics of an electrochemical cell. The differential capacity data uses galvanostatic control of the electrochemical system being tested, and plots the capacity increase (charge) or decrease (discharge) as a function of potential.

Figure 12:
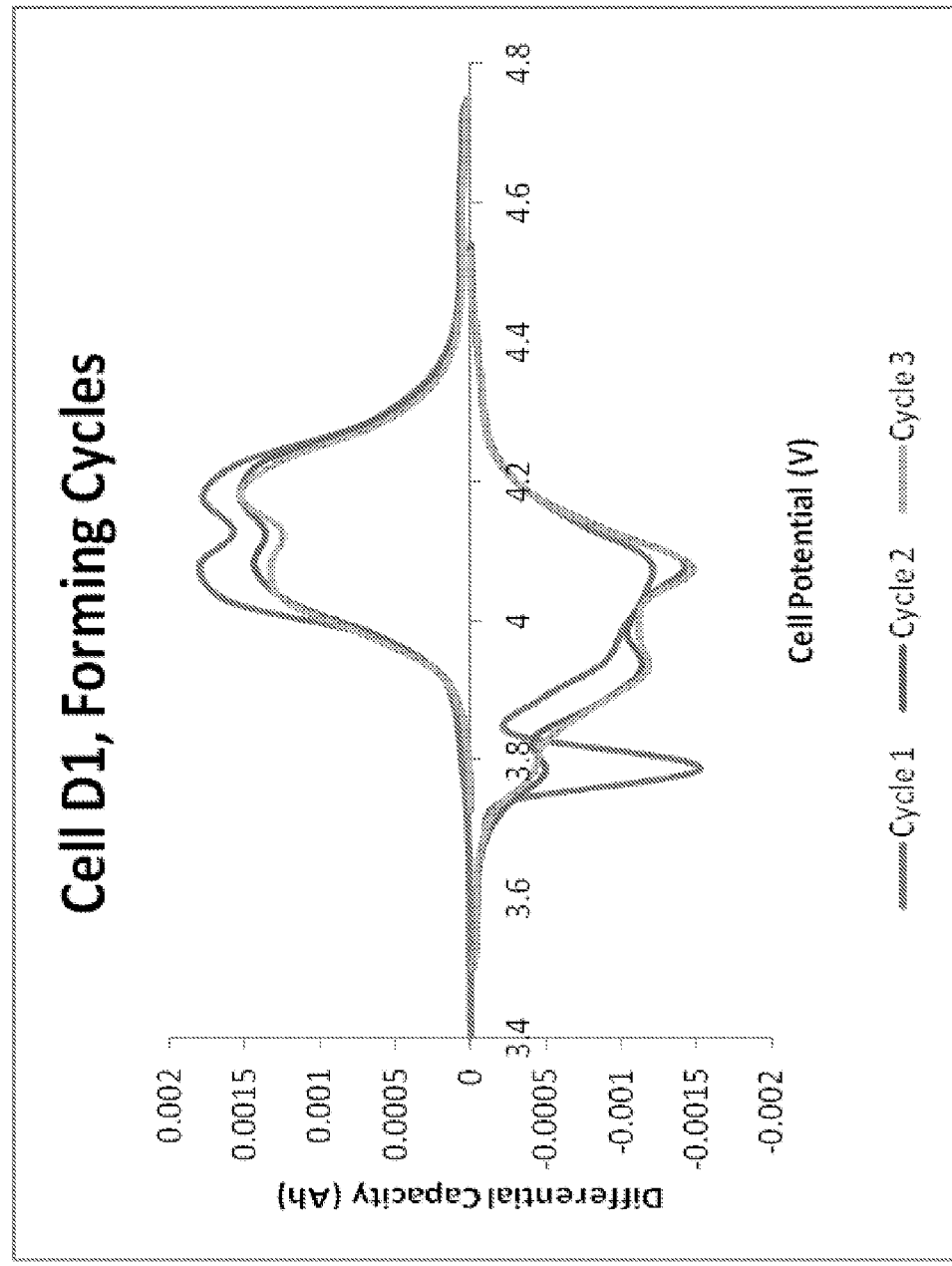
FIG. 12 is a differential capacity graph illustrating the forming cycle traces for a lithium cell containing a chlorine-modified lithium manganese-based $AB_2O_4$ spinel according to the present disclosure.
Figure 13:
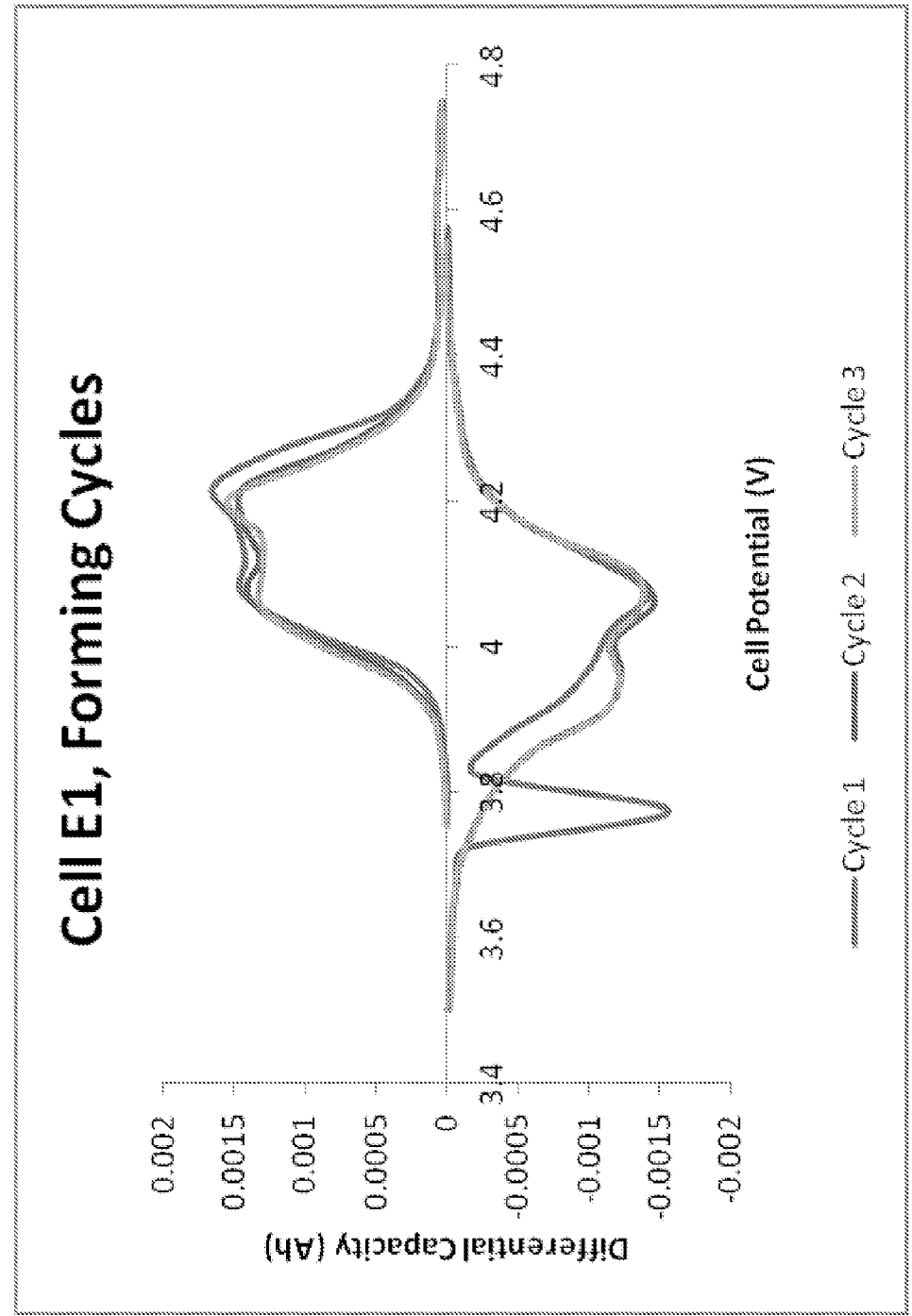
FIG. 13 is a differential capacity graph illustrating the forming cycle traces for a lithium cell containing a chlorine-modified lithium manganese-based $AB_2O_4$ spinel according to the present disclosure.

FIGS. 12 and 13 show exemplary forming cycle plots for lithium electrochemical cells fabricated with chlorine-modified lithium manganese-based $AB_2O_4$ spinel cathode material, synthesized using the method described in the present disclosure with varying chlorine ratios in the starting material. The charge/discharge data is presented as differential capacity. In FIG. 12, the stoichiometric ratio of chlorine to manganese is 0.012:2.0. In FIG. 13, the stoichiometric ratio of chlorine to manganese is 0.025:2.0.

Figure 14:
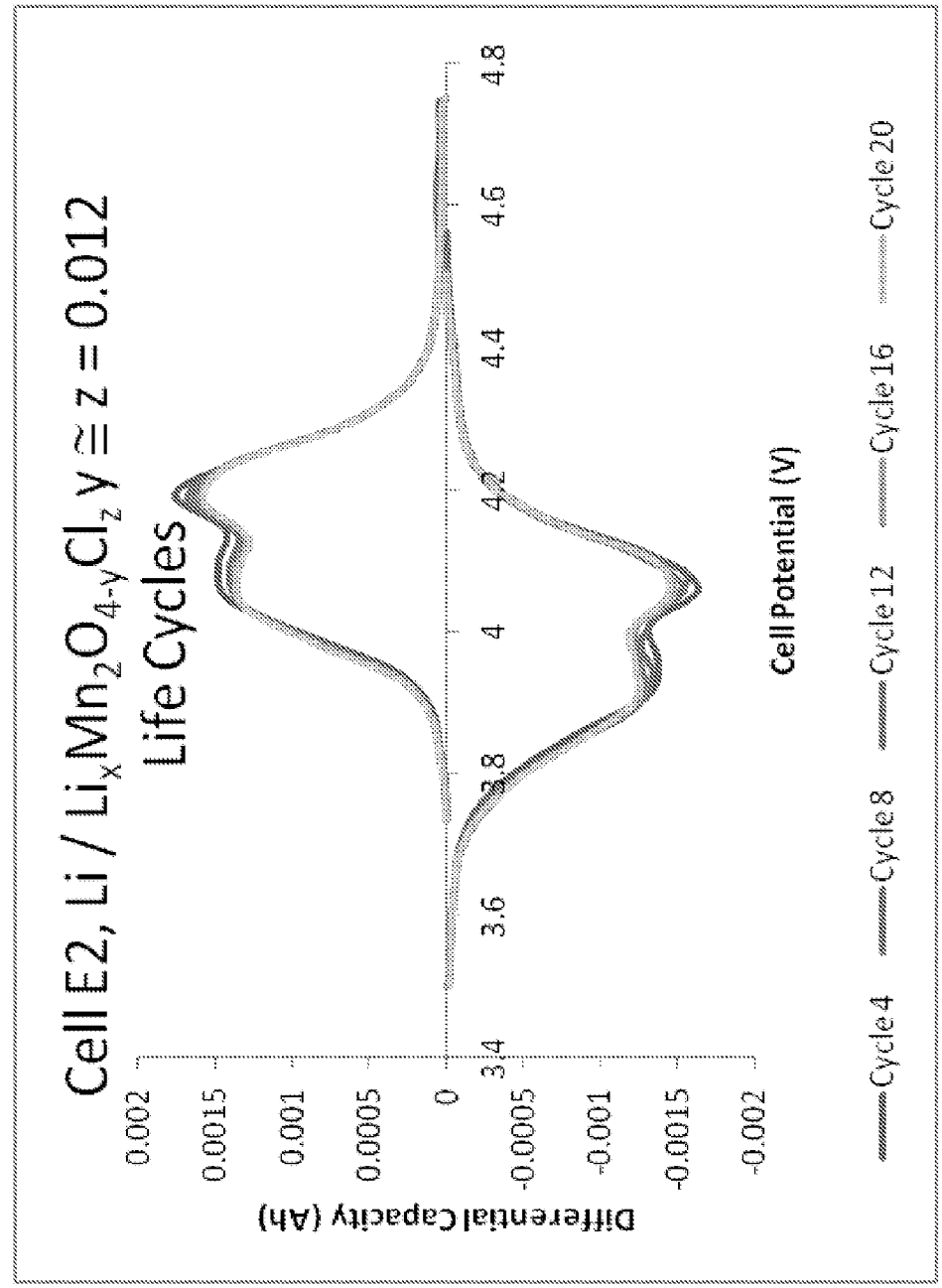
FIG. 14 is a differential capacity graph illustrating the cycle life traces for a lithium cell containing a chlorine-modified lithium manganese-based $AB_2O_4$ spinel according to the present disclosure.
Figure 15:
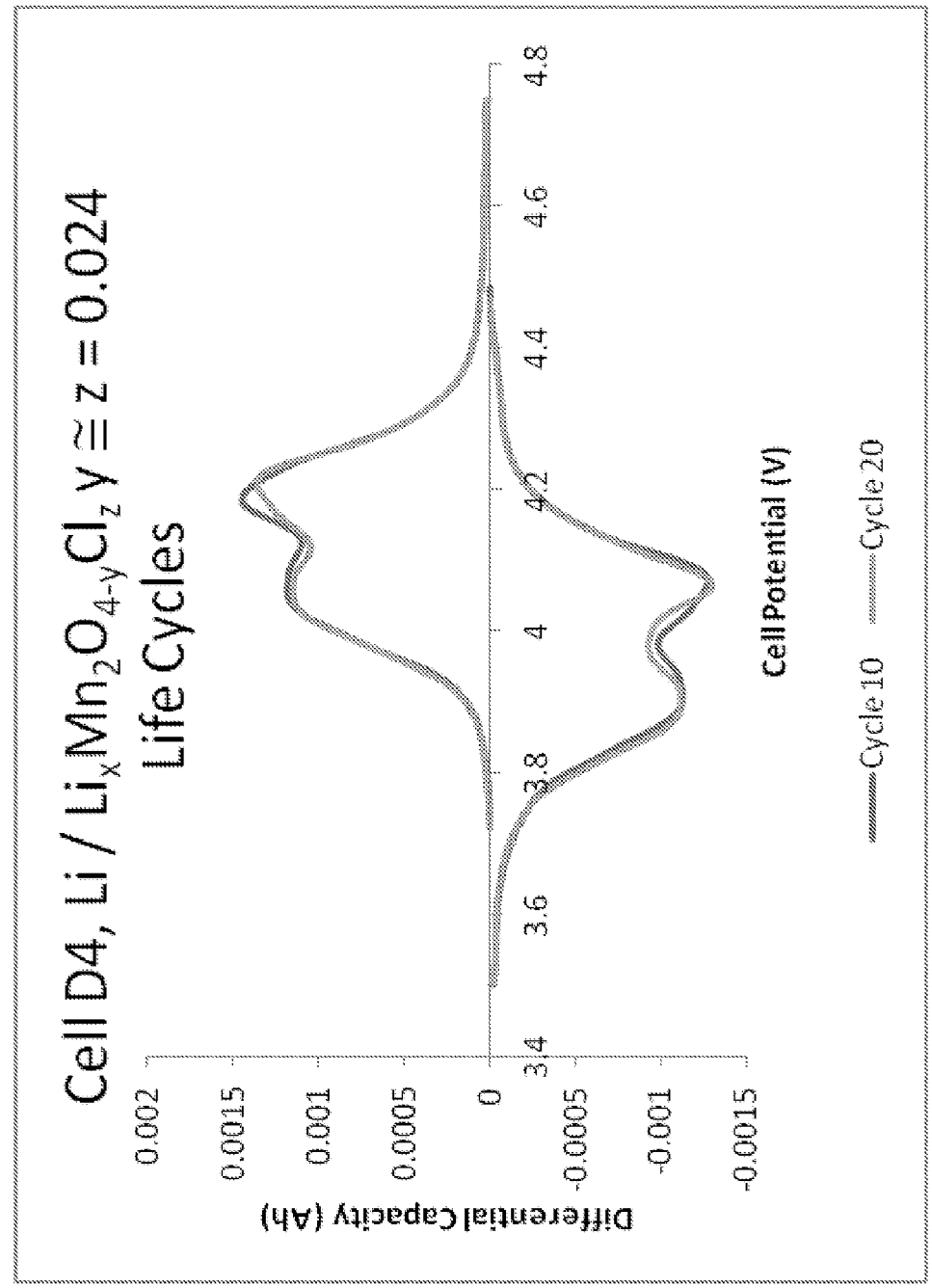
FIG. 15 is a differential capacity graph illustrating the cycle life traces for a lithium cell containing a chlorine-modified lithium manganese-based $AB_2O_4$ spinel according to the present disclosure.

FIGS. 14 and 15 are differential capacity graphs illustrating exemplary cycle life traces for lithium cells containing a chlorine-modified lithium manganese-based $AB_2O_4$ spinel according to an exemplary embodiment of the present disclosure. The figures show the stable thermodynamic behavior of the chlorine-modified lithium manganese-based $AB_2O_4$ spinel according to an exemplary embodiment of the present disclosure. In FIG. 14, the stoichiometric ratio of chlorine to manganese is 0.012:2.0. In FIG. 15, the stoichiometric ratio of chlorine to manganese is 0.025:2.0.

Figure 16:
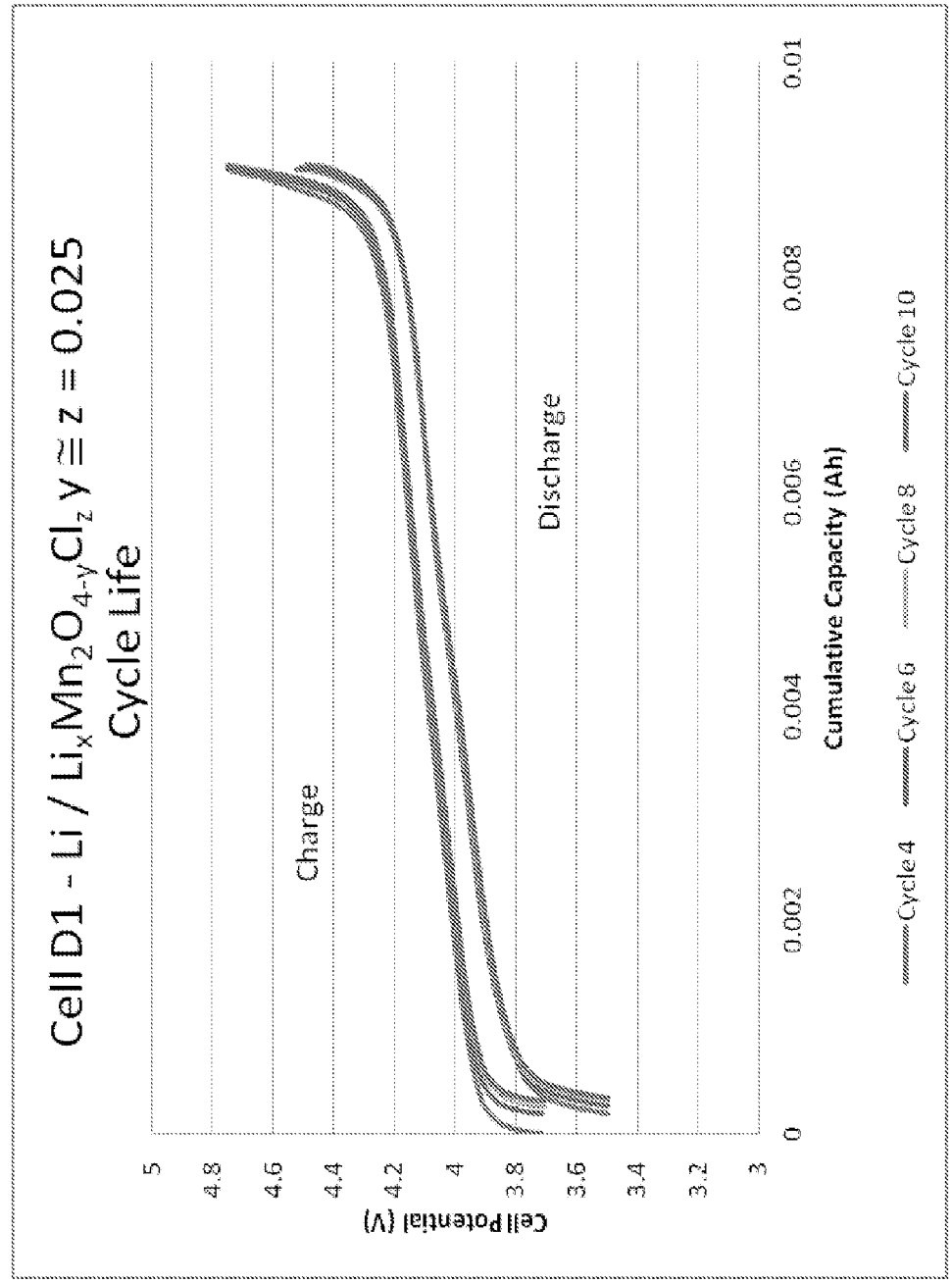
FIG. 16 is a representative hysteresis cycling (charge/discharge) curve illustrating cycle life traces for a lithium cell containing a chlorine-modified lithium manganese-based $AB_2O_4$ spinel according to the present disclosure.
Figure 17:
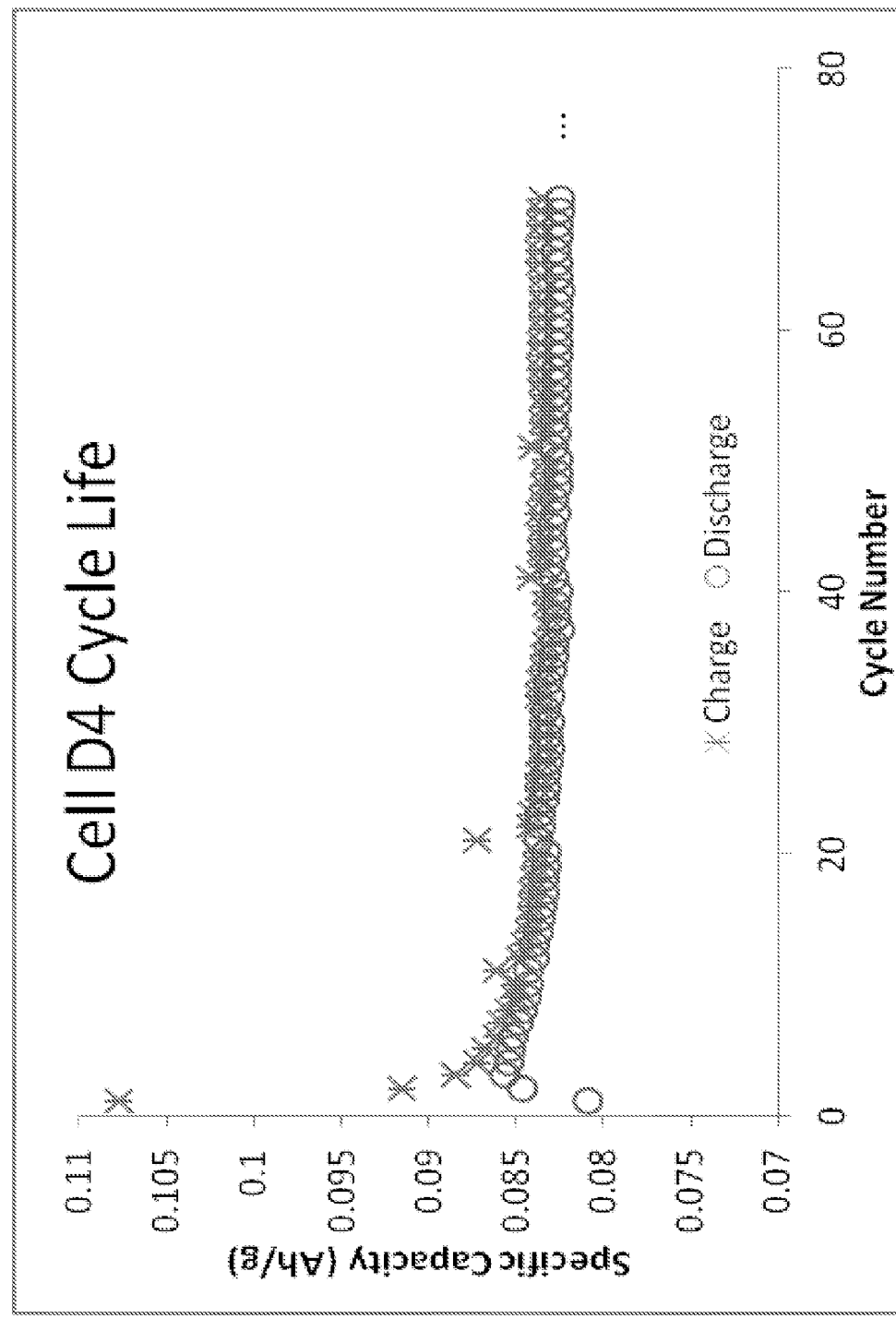
FIG. 17 is a plot of the charge capacity and delivered discharge capacity per cycle of an exemplary lithium cell containing a chlorine-modified lithium manganese-based $AB_2O_4$ spinel according to the present disclosure.

FIG. 16 is a representative hysteresis cycling (charge/discharge) curve illustrating cycle life traces for a lithium cell containing a chlorine-modified lithium manganese-based $AB_2O_4$ spinel according to an exemplary embodiment of the present disclosure. FIG. 17 is a plot of the charge capacity and delivered discharge capacity per cycle of an exemplary lithium cell containing a chlorine-modified lithium manganese-based $AB_2O_4$ spinel according to an exemplary embodiment of the present disclosure. FIGS. 14-17 show the cycle life achieved with the chlorine-modified lithium manganese-based $AB_2O_4$ spinel of the present disclosure The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

The invention claimed is:

1. A method of preparing a homogeneously dispersed $Li_xMn_2O_{4-y}Cl_z$ spinel material, the method comprising:
   providing a chlorine-containing salt, manganese nitrate, and lithium nitrate in distilled water or deionized water to produce an aqueous solution; and
   producing the homogeneously dispersed $Li_xMn_2O_{4-y}Cl_z$ spinel cathode material by steps comprising:
   mixing the aqueous solution with glycine to produce a mixture;
   heating the mixture to produce an ash;
   grinding the ash; and
   calcining the ground ash for a time period no greater than 5 hours at a temperature of at least 350° C.,
   wherein x ranges from 0.05 to 1.9 and y and z range from 0.005 to 0.7,
   wherein a particle size of the homogeneously dispersed $Li_xMn_2O_{4-y}Cl_z$ spinel cathode material ranges from 2.5 µm to less than 10 µm, and
   wherein the heating step comprises:
   heating the mixture at a temperature ranging from 75° C. to 120° C. to produce a gel; and
   heating the gel at a temperature ranging from 200° C. to 300° C. to produce an ash.

2. The method according to claim 1, wherein the chlorine-containing salt is a compound selected from a group consisting of lithium chloride and manganese chloride.

3. The method according to claim 1, further comprising mixing the homogeneously dispersed $Li_xMn_2O_{4-y}Cl_z$ spinel cathode material with a conductive carbon and a binder.

4. The method according to claim 3, wherein the conductive carbon is selected from a group consisting of carbon black, graphite, carbon nanofibers, and carbon nanoparticles.

5. The method according to claim 3, wherein the binder is selected from a group consisting of polytetrafluoroethylene, polyvinylidene fluoride, and latex.

* * * * *